United States Patent [19]

Woodruff

[11] Patent Number: 4,466,196
[45] Date of Patent: Aug. 21, 1984

[54] LASER ALIGNMENT SYSTEM FOR VEHICLES

[76] Inventor: James L. Woodruff, 240 Windward Passage #302, Clearwater, Fla. 33515

[21] Appl. No.: 349,592

[22] Filed: Feb. 17, 1982

[51] Int. Cl.³ .............................................. G01B 11/26
[52] U.S. Cl. .................................. 33/288; 33/203.18; 356/152
[58] Field of Search .................. 356/152, 155; 33/288, 33/203.18

[56] References Cited

U.S. PATENT DOCUMENTS

| | | | |
|---|---|---|---|
| 3,962,796 | 6/1976 | Johnston | 33/288 |
| 3,963,352 | 6/1976 | Rishoud | 356/152 |
| 4,097,157 | 6/1978 | Lill | 356/152 |
| 4,130,362 | 12/1978 | Lill | 356/152 |
| 4,135,823 | 1/1979 | Horvallius | 356/148 |
| 4,142,299 | 3/1979 | Alsina | 33/288 |
| 4,150,897 | 7/1979 | Roberts | 356/152 |
| 4,154,531 | 5/1979 | Roberts | 356/152 |
| 4,302,104 | 11/1981 | Hunter | 356/152 |
| 4,303,338 | 12/1981 | Morrison | 356/155 |
| 4,311,386 | 1/1982 | Coetsier | 33/288 X |
| 4,330,945 | 5/1982 | Eck | 33/203.18 X |
| 4,349,965 | 9/1982 | Alsina | 33/288 |

OTHER PUBLICATIONS

Hughes Aircraft Co., "Helium-Neon and Waveguide $CO_2$ Laser Systems and Equipment from Hughes," Brochure 7-80.
Lee Hunter, "Wheel Alignment Equals Motion Balance," Form 159T, 10-77.

Primary Examiner—Harry N. Haroian

[57] ABSTRACT

A laser alignment system for vehicles includes a laser module for attachment to either the front or rear wheels of a vehicle, a sensor module for attachment to the other wheels of the vehicle, and a control module connected to the laser module and the sensor module. Both the laser module and the sensor module can be attached to wheel spindles by the use of magnets, thereby eliminating rim adaptors and speeding set-up time. The modules are movable relative to the spindles and to each other so as to correct for vehicle unevenness, frame damage, and non-level floors. An electro-mechanical pendulum included as part of the sensor module provides fast, accurate caster and camber readings on a continuous basis for each wheel. The sensor module provides continuous, optical readouts of toe-in and toe-out for each wheel.

13 Claims, 15 Drawing Figures

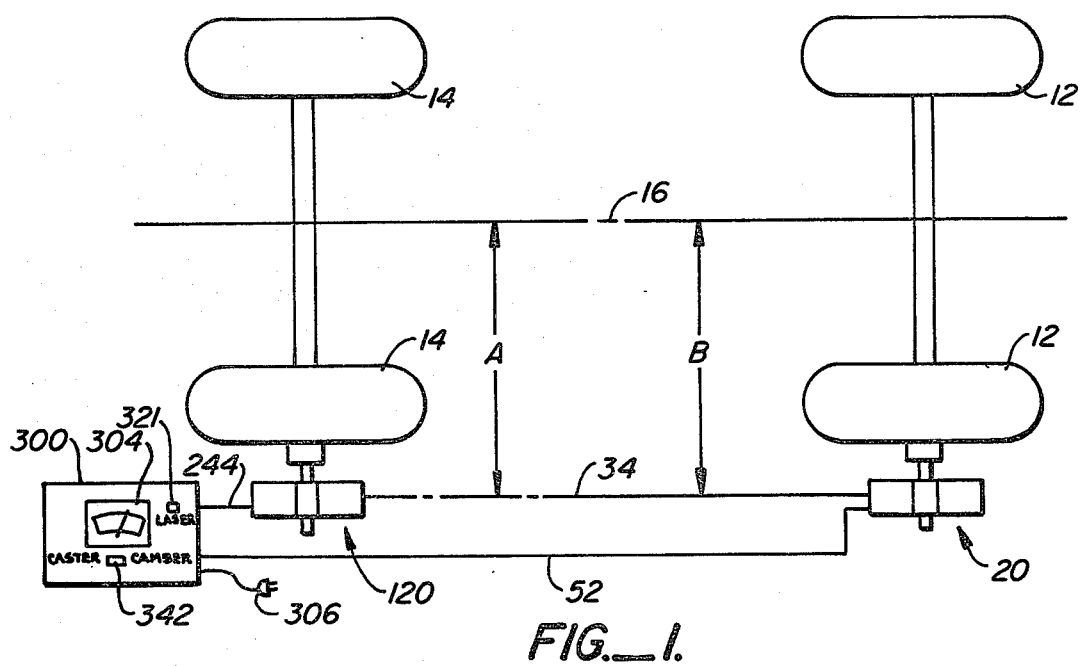
FIG._1.
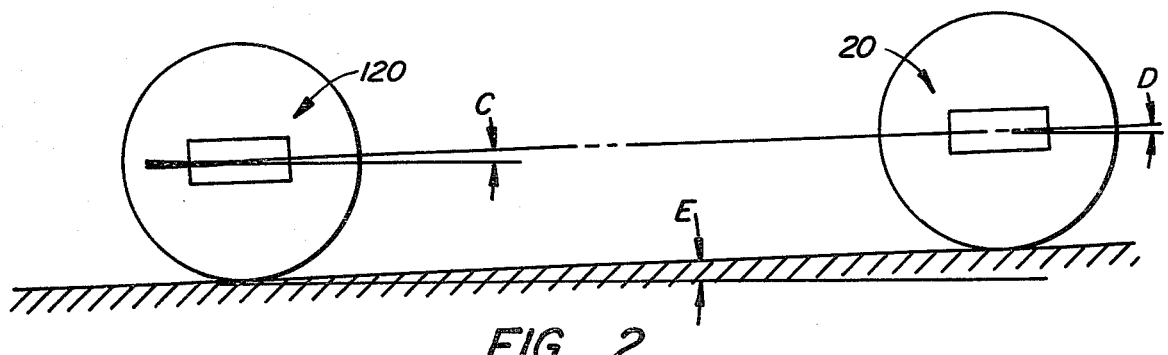
FIG._2.
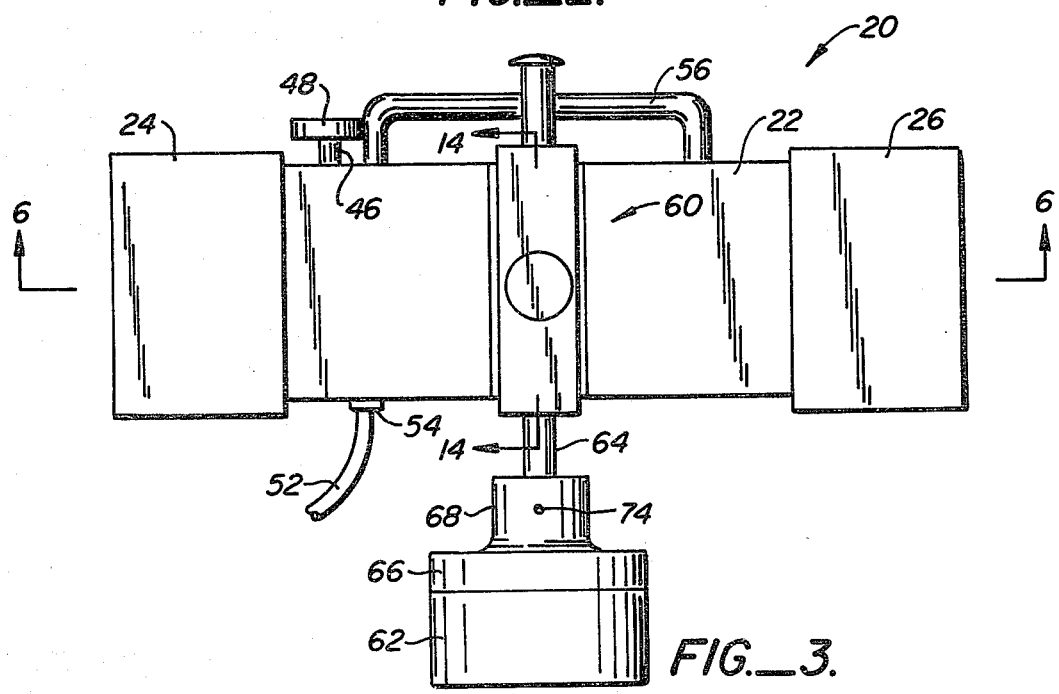
FIG._3.

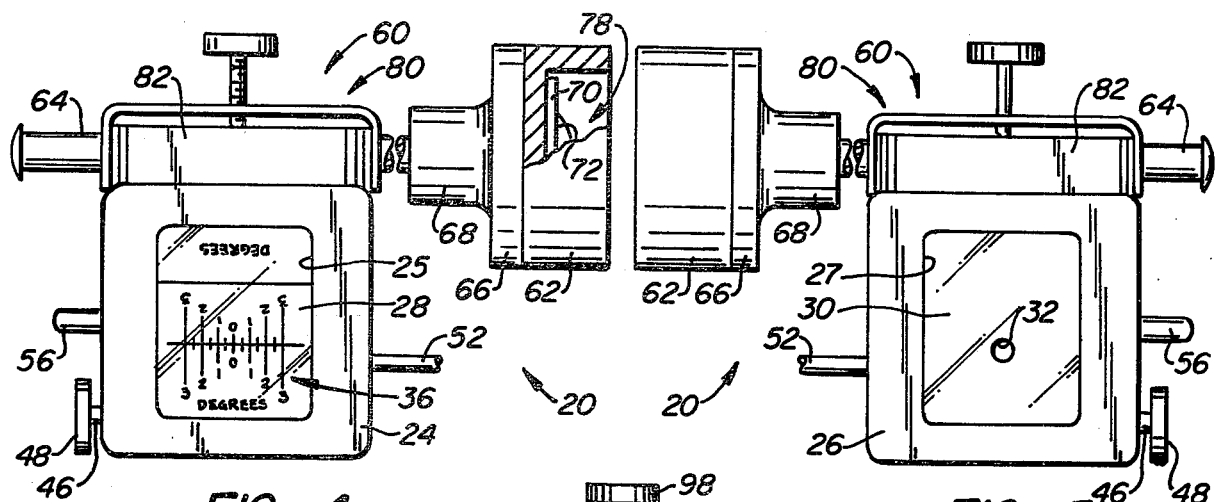
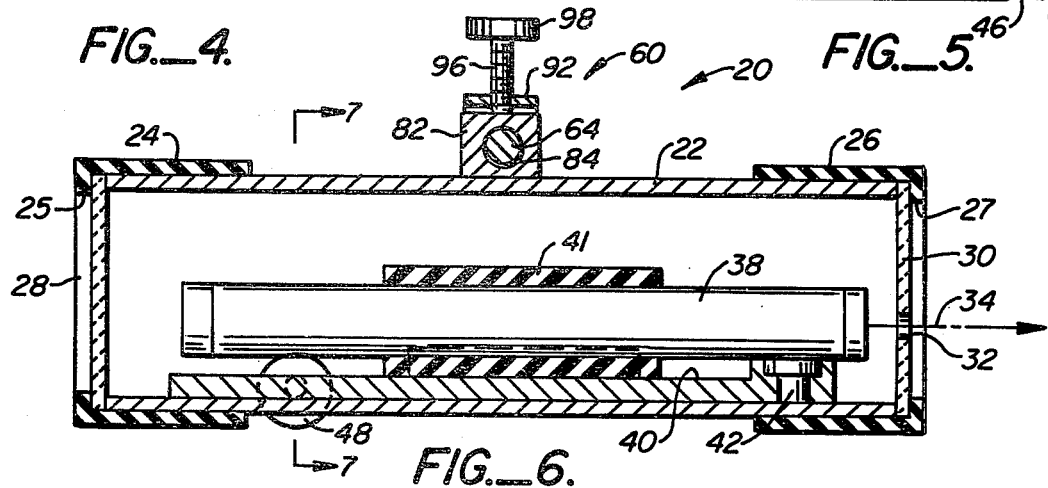
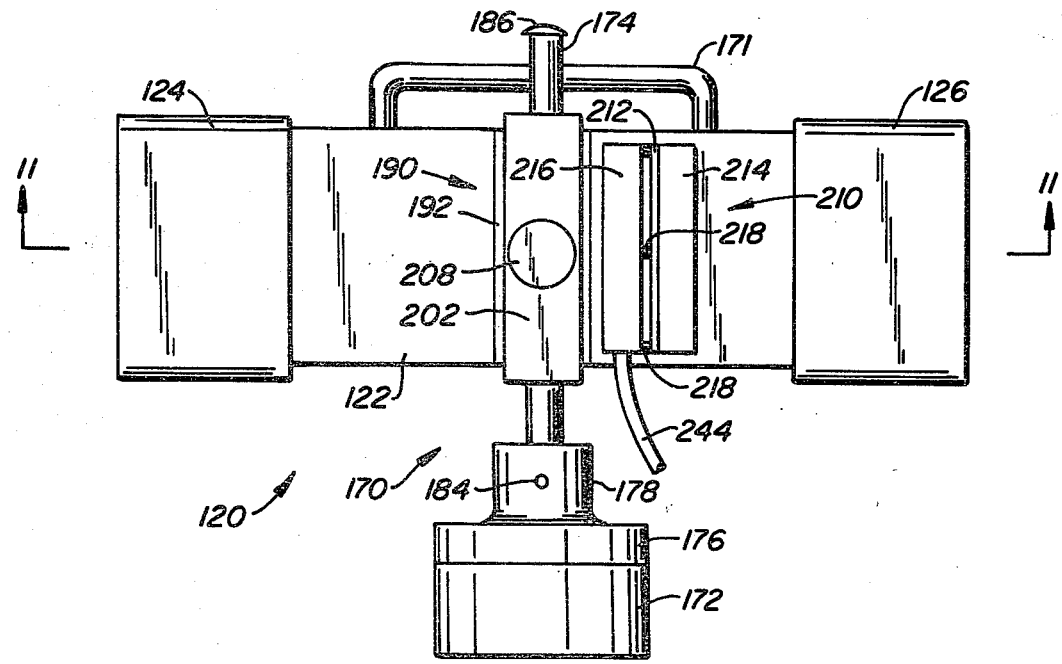

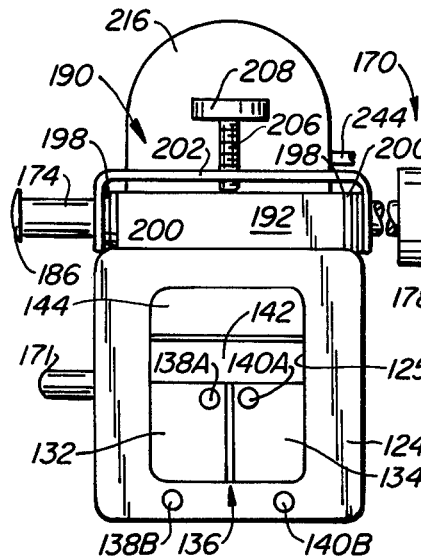
FIG._9.
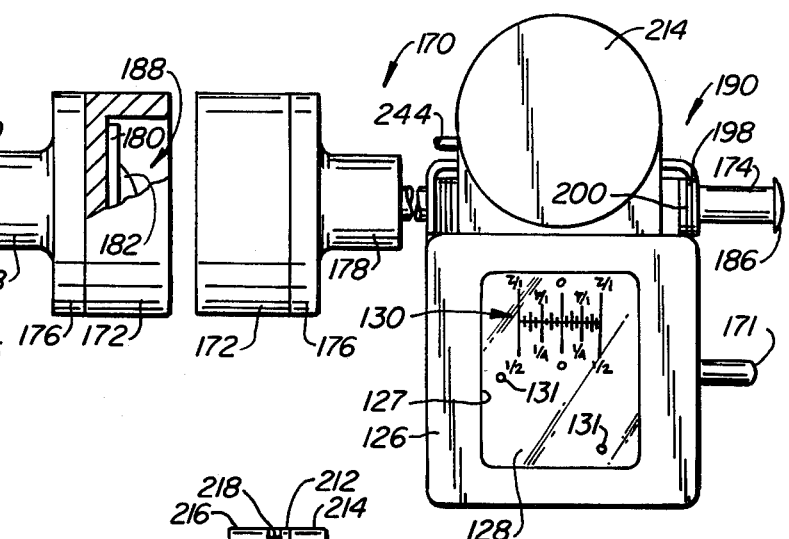
FIG._10.
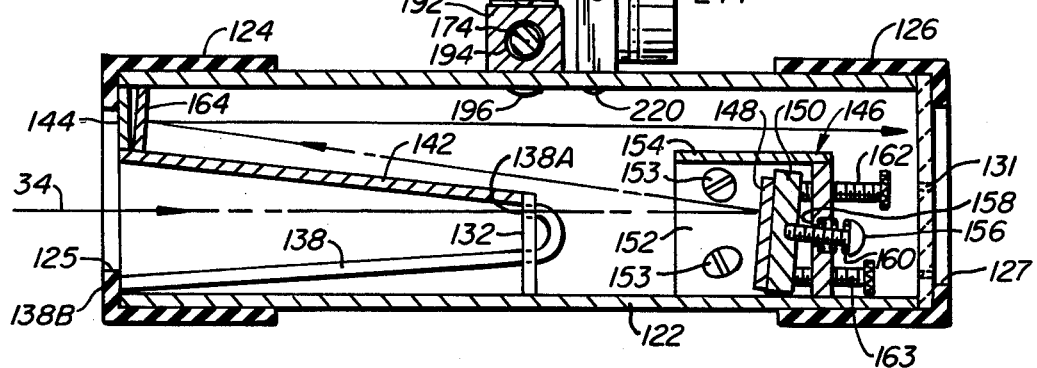
FIG._11.
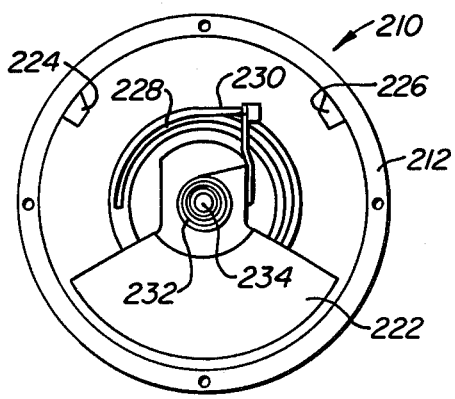
FIG._12.
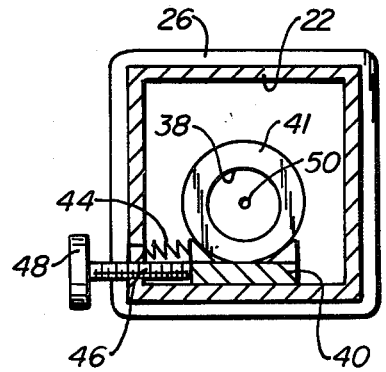
FIG._7.

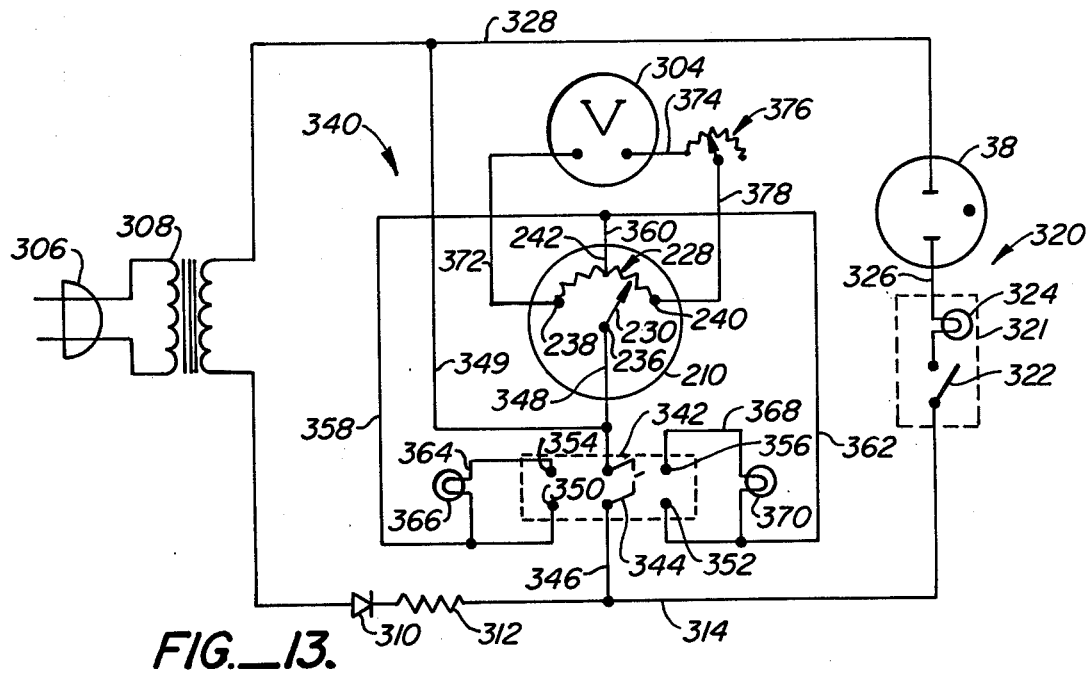
FIG._13.
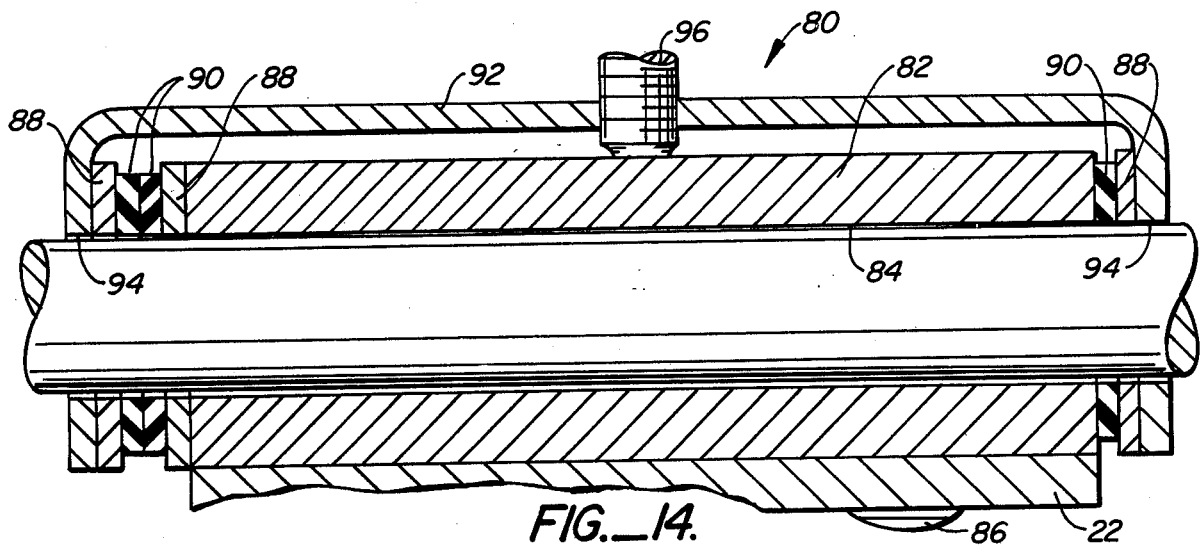
FIG._14.
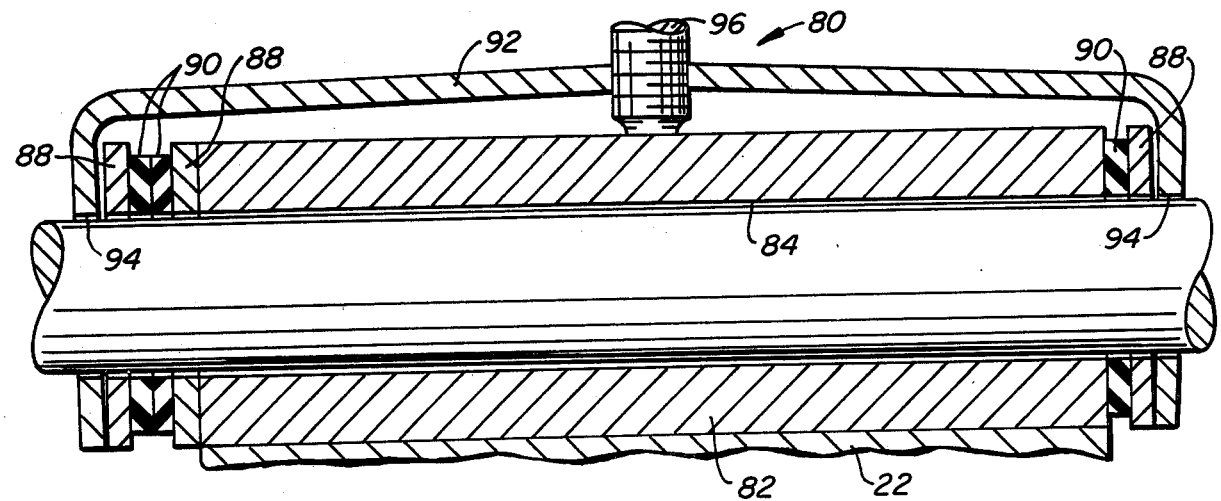
FIG._15.

LASER ALIGNMENT SYSTEM FOR VEHICLES

CROSS-REFERENCE TO RELATED APPLICATION

MODULE FOR WHEEL ALIGNMENT SYSTEM, design patent application, Ser. No. 349,523, filed concurrently by James L. Woodruff.

BACKGROUND OF THE INVENTION

1. Field of the Invention

The invention relates to alignment systems for vehicles and, more particularly, to an alignment system employing a laser beam and an electro-mechanical pendulum.

2. Description of the Prior Art

Prior wheel alignment systems for vehicles have suffered from a variety of drawbacks which have limited their effectiveness. Early wheel alignment systems employed mechanical components such as calibers to measure and adjust steering geometry parameters such as toe-in and toe-out. Mechanical techniques such as these were very cumbersome, difficult to use, and very time-consuming. Among other deficiencies, these techniques could not provide a continuous readout of steering geometry parameters; measurements had to be made with the wheels in one position and separate measurements had to be made with the wheels in other positions. In addition, the difficulty in using these devices often required that a special section of a garage be dedicated exclusively for alignment purposes. Special racks sometimes would be installed permanently for alignment purposes, and these racks could be used for no other purposes than doing vehicle alignment work.

In an attempt to alleviate difficulties associated with mechanical alignment systems, various wheel-mounted optical systems have been developed. Generally speaking, these optical systems project a beam of light to a sensor mounted on one or both front wheels of a vehicle. Unfortunately, these optical systems have been difficult to set-up, and have been unduly complex and expensive. The use of a conventional light beam has led to inaccuracies because the beam undesirably increases in diameter over a relatively short distance. Moreover, prior optical systems have aligned the front wheels of a vehicle by reference to each other, rather than by reference to the chassis of the vehicle. Accordingly, these systems have provided only relative alignment measurements, rather than absolute alignment measurements. In turn, these systems have been unable to take into account mechanical misalignments due to frame damage, bent parts, and the like. Moreover, they have not been able to take into account the effects of sloping or otherwise irregular floors. Accordingly, these systems still require that a special section of a garage be set aside exclusively for vehicle alignment purposes, and special racks still must be used as part of the alignment process.

A particular type of optical alignment system that has had some promise employs a laser beam, rather than a conventional light beam. A laser beam is of interest because a laser beam tends to remain relatively constant in diameter over great distances. Accordingly, the use of a laser beam is desirable because of the accuracy that theoretically is possible by the use of such a beam of light. Unfortunately, the proposed laser beam system has not been entirely successful, in part because a sensor unit employing a photocell has been used. The laser beam impinging on the photocell causes changes in electrical output of the photocell. Depending upon the amount of light striking different portions of the photocell, these changes in electrical output can be correlated to orientation of the wheel relative to the light beam; in turn, readings of steering geometry can be obtained. The most important drawback of this system is that attenuation of the laser beam for any reason influences the output of the photocell and, thus, steering geometry readouts being obtained. For example, airborne dust or other optical attenuators such as cigarette smoke will cause inaccurate readings, thus rendering this proposed system unacceptable under many circumstances.

In view of the difficulties associated with prior wheel alignment systems, there remains a need for an optical alignment system employing the favorable features of a laser beam, without the drawbacks of prior proposals such as undue complexity, expense, lengthy set-up times and the like. Additionally, it is desirable to have a vehicle alignment system that will provide absolute readings of steering geometry, rather than relative readings of steering geometry. Furthermore, it is desirable to have a wheel alignment system that can be used in a great variety of places, and which will not require the use of special racks or sections of a garage.

SUMMARY OF THE INVENTION

The present invention overcomes the foregoing and other difficulties of prior proposals by providing a new and improved alignment system for vehicles employing a laser module, a sensor module, and a control module. The modules are compact, relatively inexpensive, portable, and can be set up for alignment purposes in a minimal amount of time. The laser and sensor modules can be secured quickly to the wheels of most vehicles without requiring special rim adaptors.

In the preferred practice of the invention, the laser module includes a housing within which a laser unit is disposed. The housing is secured to the spindle of a vehicle's wheels by means of a magnet. A shaft projects from the magnet along an axis perpendicular to a plane in which the surface of the wheel spindle lies. The housing is connected to the shaft by means of an adjustable clamp which permits the laser housing to be moved toward or away from the wheel, and to be pivoted about the shaft and maintained in a selected angular position. The laser unit is adjustable relative to the housing to project a beam outwardly of the housing in a selected direction. An optical readout is provided for the housing to enable the position of the laser beam relative to the housing to be determined quickly.

The sensor module, like the laser module, includes a housing, a magnet for attachment to the wheel of a vehicle, a shaft projecting from the magnet, and a clamp for connecting the housing to the shaft. The sensor housing, in a manner similar to that of the laser housing, is adjustable toward and away from the wheel, and also can be positioned in any desired angular position relative to the shaft. The sensor module includes an electro-mechanical pendulum. The pendulum provides an electrical readout indicative of the pendulum's position relative to the horizon. The pendulum is contained within a case fixedly attached to the sensor housing. By appropriate calibration of the electrical output of the pendulum, the position of the sensor housing relative to the horizon can be determined quickly and accurately. In turn, by reference to published specifications, caster and camber readings for the vehicle's wheels can be determined.

The sensor module includes a pair of spaced plates defining a slit through which the laser beam projected from the laser module must pass. In order to determine that the laser beam is striking the slit from the proper direction, an optical indicator is provided. The optical indicator is in the form of curved, acrylic rods. One end of each rod is positioned adjacent the slit facing outwardly of the module, while the other end of each rod is positioned adjacent the end of the sensor module housing closest to the laser module, also facing outwardly of the module. Accordingly, when the laser beam strikes the ends of the rods located adjacent the slit, an optical indication of the exact point of impingement is provided by the degree to which the other ends of the rods are illuminated. When the beam entering the slit is centered, the ends of the rods adjacent the end of the housing will be illuminated to the same extent, and this condition can be determined readily.

After passing through the slit, the beam is reflected back and forth between mirrors and is projected onto a translucent screen. The mirrors and screen are spaced relative to each other to provide an optical gain for the beam to comply with industry standards for making vehicle wheel alignment readings. The screen, in effect, is positioned forwardly of the wheel and a direct optical readout of toe-in or toe-out can be made.

The control module includes electrical components necessary to provide 12 volts DC to the laser module, as well as 12 volts DC to the pendulum. The control module also includes appropriate circuitry and a meter for correlating pendulum position to caster and camber readings. The control module is contained within a compact case for easy portability.

By use of an alignment system according to the invention, set-up time is reduced markedly compared with prior mechanical or optical alignment systems. Due to the continuous readout provided by the pendulum and the laser beam, uneven vehicle load conditions can be compensated for during initial set-up. Moreover, the effects of an uneven floor can be compensated for during initial set-up, thereby eliminating the need for any special racks or sections of a garage to be used for alignment purposes. Compared with prior alignment systems, the alignment system according to the invention is accurate, mechanically and electrically straightforward, inexpensive, and reliable.

The foregoing and other features, and a more complete understanding of the invention, may be had by referring to the following description and claims, taken in conjunction with the accompanying drawings.

BRIEF DESCRIPTION OF THE DRAWINGS

FIG. 1 is a schematic plan view of a four-wheeled vehicle with which the alignment system according to the invention is being employed;

FIG. 2 is a schematic side elevational view of the vehicle of FIG. 1;

FIG. 3 is a top plan view of a laser module according to the invention;

FIGS. 4 and 5 are end elevational views of the laser module of FIG. 3;

FIG. 6 is a cross-sectional view of the laser module of FIG. 3 taken along a plane indicated by line 6—6 in FIG. 3, and showing in more detail the internal construction of the laser module;

FIG. 7 is a view, partly in cross-section, of the laser module of FIG. 3 taken along a plane indicated by line 7—7 in FIG. 6, and showing in more detail an adjustment mechanism used to position a laser beam relative to a housing;

FIG. 8 is a top plan view of a sensor module according to the invention;

FIGS. 9 and 10 are end elevational views of the sensor module of FIG. 8;

FIG. 11 is a view, partly in cross-section, of the sensor module of FIG. 8 taken along a plane indicated by line 11—11 in FIG. 8;

FIG. 12 is a view of the inside of an electromechanical pendulum employed as part of the invention;

FIG. 13 is a schematic view of electrical circuitry employed as part of the invention;

FIG. 14 is a view, partly in cross-section, of an adjustable clamp employed with both the laser module and the sensor module, the clamp being illustrated in an unlocked position; and, FIG. 15 is a view similar to FIG. 14, showing the clamp in a locked position.

DESCRIPTION OF THE PREFERRED EMBODIMENT

Referring to the FIGURES, an alignment system 10 according to the invention includes a laser module 20, a sensor module 120, and a control module 300. The system 10 is shown as it might be attached to a vehicle having rear wheels 12, front wheels 14, and a chassis having a longitudinally extending reference line indicated by the numeral 16. Referring particularly to FIGS. 1 and 2, the laser module 20 is secured to one of the rear wheels and is positioned a distance indicated by the letter "A" from the reference line 16. The sensor module 120 is secured to one of the front wheels and is positioned relative to the reference line 16 a distance indicated by the letter "B." The reference line 16 need not be exactly aligned with the longitudinal centerline of the chassis, but can be any fixed reference point parallel with the centerline as is well known. For example, the reference line 16 may be taken as a longitudinally extending weld at one side of the vehicle's frame, in which event the dimensions A and B would be on the order of 14 inches.

The modules 20, 120 not only can be moved toward or away from the reference line 16, but also may be fixed in any desired angular position relative to the horizon. The angular positioning of the modules 20, 120 is indicated in FIG. 2 by the angles "C" and "D," respectively. The alignment system 10 does not require that any particular rack be used for the vehicle, or that any particular floor orientation relative to the horizon be provided. As shown in FIG. 2, it will be assumed that the vehicle is resting on a floor inclined at an unknown angle to the horizon indicated by the letter "E." It also will be assumed that the floor is inclined at an unknown angle to the horizon when viewing the vehicle from the front or rear. This inclined condition of the floor is not illustrated in the FIGURES.

I. The Laser Module 20

Referring particularly to FIGS. 3–7, the laser module 20 includes a polyhedron housing 22 having elastomeric end caps 24, 26. Each of the end caps 24, 26 includes an inwardly turned lip defining a rectangular opening 25, 27, respectively. The end cap 24 is fitted about a translucent panel 28 secured to the end of the housing 22. The other end cap 26 similarly is fitted about a translucent panel 30 secured to the other end of the housing 22. The panel 30 includes an opening 32 through which a laser beam indicated in the FIGURES by the reference numeral 34 can be projected without attenuation. The panel 28 includes a scale indicated by the reference numeral 36 and identified in FIG. 4 by the designation "degrees." The scale 36 enables the position of the laser beam 34 relative to the housing 22 to be determined optically.

In order to provide for lightweight, sturdy construction, the housing 22 is formed of extruded aluminum. The panels 28, 30 are bonded to the housing 22 by means of a silicone sealant. The end caps 24, 26 are molded from silicone rubber and are sufficiently resilient that they minimize or eliminate shock damage to the module 20 in the event of it being dropped or otherwise treated roughly.

A laser unit 38 is disposed within the housing 22. An acceptable laser unit 38 is a helium-neon laser commercially available from the Hughes Aircraft Company, Carlsbad, Calif. 92008, Model No. 3025H, 0.5 milliwatts output at 12 volts DC input. The laser unit 38 is cylindrical and is attached to a base plate 40 by means an annular, elastomeric mount 41. The base plate 40 is pivotally secured to the housing 22 by means of a spindle 42. In use, the housing 22 is secured to one of the wheels such that the spindle 42 is oriented generally vertically. Accordingly, the laser unit 38 can be adjusted relative to the housing 22 to project the beam 34 along different paths in a generally horizontal plane.

An adjusting mechanism is provided for the laser unit 38 so as to control the position of the laser unit 38 relative to the housing 22. Referring particularly to FIG. 7, the adjustment mechanism includes a spring 44 connected between the housing 22 and a portion of the base plate 40 remote from the spindle 42. A threaded rod 46 extends through a threaded opening in the housing 22 and engages the base plate 40. The rod 46 includes a thumb wheel 48. The spring 44 always biases the plate 40 toward the left side of the housing 22 as viewed in FIG. 7. Accordingly, the base plate 40 constantly is urged into engagement with the end of the rod 46. By appropriate adjustment of the rod 46 through manipulation of the wheel 48, the position of the base plate 40 relative to the housing 22 can be adjusted. In turn, the position of the laser unit 38 relative to the housing 22 can be adjusted. A small opening 50 is provided in the end of the laser unit 38 so that a small amount of light will be emitted. The light emitted through the opening 50 will be visible on the scale 36, thereby providing the user with a convenient optical indication of the position of the laser unit 38 relative to the housing 22.

Referring to FIGS. 1, 3, 4, and 5, electrical power to the laser unit 38 is provided by a cable 52. The cable 52 extends through an opening in the housing 22 and is secured in position relative to the housing 22 by means of a grommet 54. Referring to FIGS. 3–5, a handle 56 is secured to the side of the housing 22 opposite that side through which the cable 52 extends. The handle 56 is generally U-shaped and enables the laser module 20 to be carried conveniently.

The laser module 20 includes a mounting assembly 60 for securing the module 20 to the spindle of a wheel. The mounting assembly 60 includes a cylindrical, cup-like magnet 62 from which a shaft 64 projects. The magnet 62 is secured to a disc-like flange 66 from which a necked-down portion 68 projects. The necked-down portion 68 is hollow and receives the shaft 64. The magnet 62 is secured to the flange 66 by means of a washer 70 and a threaded fastener 72. The necked-down portion 68 is secured to the shaft 64 by means of a set screw 74. The shaft 64 includes a protective cap 76 at the end of the shaft 64 remote from the magnet 62. By this construction, the magnet 62 and the shaft 64 are rigidly secured relative to each other. Because the magnet 62 is hollowed out as indicated by the reference numeral 78, the module 20 can be attached to certain wheels having portions projecting from the spindle.

The mounting assembly 60 also includes a clamp 80. The clamp 80 includes an elongate block 82 having an opening 84 through which the shaft 64 extends in closely fitting relationship. Referring particularly to FIGS. 14 and 15, the block 82 is secured to the housing 22 by means of threaded fasteners 86. Steel washers 88 having rubber faces 90 are fitted about the shaft 64 as indicated in FIGS. 14 and 15. A U-shaped yoke 92 having openings 94 is fitted about the shaft 64 and overlies the block 82. A threaded rod 96 extends through a threaded opening in the center of the yoke 92 and engages the upper portion of the block 82. The rod 96 includes a thumb wheel 98 to permit convenient adjustment of the rod 96.

Referring to FIG. 14, when the rod 96 is loosened, the openings 84, 94 and the shaft 64 are relatively loosely engaged. In this condition, the laser module 20 can be moved back and forth along the shaft 64 with relatively little difficulty. The washers 90 provide some resistance to movement along the shaft 64, but movement still is possible. In the position illustrated in FIG. 15, the rod 96 is tightened and the yoke 92 is slightly bowed. The openings 84, 94 are tightly engaged with the shaft 64, thereby preventing any axial movement of the laser module 20 relative to the shaft 64. In addition to preventing axial movement, the tight-fitting nature of the components in that position illustrated in FIG. 15 also prevents pivotal movement of the module 20 about the shaft 64.

II. The Sensor Module 120

The sensor module 120 includes many components similar, or identical, to components employed with the laser module 20. The sensor module 120 includes a polyhedron housing 122 having elastomeric end caps 124, 126. Each of the end caps 124, 126 includes an inwardly turned lip defining a rectangular opening 125, 127, respectively. The end cap 126 is fitted about a transluscent panel 128 secured to the end of housing 122. The panel 128 includes a scale indicated by the reference numeral 130 in FIG. 10. The scale 130 enables the position of the laser beam 34 relative to the housing 122 to be determined optically. The panel 128 also includes a pair of small openings 131. The other end of the housing 122 is open so as to provide no restriction to passage of the beam 34 into the housing 122.

In a manner similar to the construction of the laser module 20, the housing 122 is formed from extruded aluminum. The panel 128 is bonded to the housing 122 by means of a silicone sealant. The end caps 124, 126 are molded from silicone rubber and are sufficiently resilient that they minimize or eliminate shock damage to the module 120 in the event of it being dropped or otherwise treated roughly.

The sensor module 120 includes a pair of spaced plates 132, 134 defining a slit 136 through which the laser beam 34 must pass. In order to determine that the laser beam is striking the slit 136 from the proper direction, an optical indicator is provided. The optical indicator is formed of curved, acrylic rods 138, 140. A first end 138A, 140A of each rod 138, 140 is positioned adjacent the slit 136 on either side of the slit 136. The ends 138A, 138B face outwardly of the module 120 and are in a position to be struck by the beam 34 passing through the opening 127. The other end 138B, 140B of each rod 138, 140 is positioned adjacent the end of the housing 122 closest to the laser module 20 and is secured in place by being fitted into openings formed in the end cap 124. As will be apparent from an examination of FIGS. 9 and 11, the ends 138B, 140B face outwardly of the module 120. Accordingly, when the laser beam 34 strikes the ends 138A, 140A located adjacent the slit 136, an optical indication of the exact point of impingement is provided by the degree to which the other ends 138B, 140B are eliminated. When the beam 34 entering the slit 136 is centered, the ends 138B, 140B will be illuminated to the same extent, and this condition can be determined readily.

In order to stabilize the plates 132, 134 in a position substantially perpendicular to the walls of the housing 122, and in order to provide proper conditions of darkness within the housing 122, an inclined support plate 142 extends from a position adjacent the end cap 124 to the upper end of the support plates 132, 134. A plate 144 is fitted at that end of the housing 122 adjacent the end cap 124. The plate 144 connects with the plate 142 in a light-tight relationship. The plate 144 also is tightly sealed to portions of the housing 122 to assist in providing a relatively light-tight environment within the housing 122. The plates 132, 134, 142, 144 are bonded to each other and to the housing 122 by means of silicone sealant.

After passing through the slit 136, the beam 34 is directed to a mirror assembly 146. The mirror assembly 146 includes a mirror 148, a back-up plate 150, an L-shaped mounting bracket 152 secured to the housing 122 by means of fasteners 153, and a cover plate 154 secured to the top of the back-up plate 150. The assembly 146 also includes a threaded fastener 156 secured to the back-up plate 150 and extending through a relatively large opening 158 in the bracket 152, a spring 160 interposed between the head of the fastener 156 and the plate 152, and adjusting screws 162, 163 extending through threaded openings in the plate 152 and into engagement with the plate 150. Referring particularly to FIG. 11, the fastener 156 projects from approximately the center of the plate 150. The spring 160 biases the fastener 156 and, hence, the plate 150 toward the screen 128. The adjusting screws 162, 163 engage the plate 150 and serve to restrain the plate 150 from being moved toward the plate 128. By appropriate adjustment of the screws 162, 163, the position of the plate 150 can be adjusted relative to the housing 122. In turn, the position of the mirror 148 can be adjusted. The screws 162, 163 can be adjusted by inserting a small screwdriver through the openings 131 in the panel 128.

After striking the mirror 148, the beam 34 is reflected to a second mirror 164 positioned adjacent the plate 144. The mirror 164 is fixed in place within the housing 122 by use of a silicone sealant. After striking the mirror 164, the beam 34 is reflected toward the screen 128 where it can be seen, thereby providing a reading on the scale 130 of the relative position of the beam 34 and the housing 122.

The sensor module 120 includes a mounting assembly 170 for securing the module 122 to the spindle of a wheel. In order to assist in carrying and maneuvering the module 120, a U-shaped handle 171 is secured to the housing 122. The mounting assembly 170 includes a cylindrical, cup-like magnet 172 from which a shaft 174 projects. The magnet 172 is secured to a disc-like flange 176 from which a necked-down portion 178 projects. The necked-down portion 178 is hollow and receives the shaft 174. The magnet 172 is secured to the flange 176 by means of a washer 180 and a threaded fastener 182. The necked-down portion 178 is secured to the shaft 174 by means of a set screw 184. The shaft 174 includes a protective cap 186 at that end of the shaft 174 remote from the magnet 172. By this construction, the magnet 172 and a shaft 174 are rigidly secured to each other. Because the magnet 172 is hollowed out as indicated by the reference numeral 188, the module 120 can be attached to certain wheels having portions projecting from the spindle.

The mounting assembly 170 also includes a clamp 190. The clamp 190 includes an elongate block 192 having an opening 194 through which the shaft 174 extends in closely fitting relationship. In a manner similar to that of the clamp 80 illustrated in FIGS. 14 and 15, the block 192 is secured to the housing 122 by means of threaded fasteners 196. Steel washers 198 having rubber faces 200 are fitted about the shaft 174. A U-shaped yoke 202 having openings 204 is fitted about the shaft 174 and overlies the block 192. A threaded rod 206 extends through a threaded opening in the center of the yoke 202 and engages the outer portion of the block 192. The rod 206 includes a thumb wheel 208 to permit convenient adjustment of the rod 206.

When the rod 206 is loosened, the openings 194, 204 and the shaft 174 are relatively loosely engaged. In this position, the sensor module 120 can be moved back and forth along the shaft 174 with relatively little difficulty. The washers 200 provide some resistance to movement along the shaft 174, but movement still is possible. When the rod 206 is tightened and the yoke 202 slightly bowed, the openings 194, 204 are tightly engaged with the shaft 174, thereby preventing any axial movement of the sensor module 120 relative to the shaft 174. In addition to preventing axial movement, the tightly fitting nature of the components in the tightened position also prevents pivotal movement of the module 120 about the shaft 174.

An electro-mechanical pendulum 210 is secured to the housing 122 adjacent the clamp 190. An acceptable electro-mechanical pendulum 210 is commercially available from Humphrey Inc., San Diego, Calif. 92123, Model CP 17-0601-1. The pendulum 210 includes an insulating case 212 made of a plastics material, and an aluminum cover 214. The case 212 is secured to a bracket 216 and to the cover 214 by means of fasteners 218. The bracket 216 is secured to the housing 122 at a location adjacent the clamp 190 by means of fasteners 220. The pendulum 210 is oriented such that the flat surfaces of the case 212 and the cover 214 lie in a plane orthogonal to a plane in which the face of the magnet 172 lies.

Referring particularly to FIG. 12, the pendulum 210 includes a fan-shaped weight 222 pivotally mounted to a post (not visible in FIG. 12) located at the center of the case 212. The post is oriented perpendicularly to the plane in which the outer surface of the case 212 lies. A pair of stops 224, 226 project inwardly from the rim of the case 212. The stops 224, 226 are positioned relative to the weight 222 such that a maximum travel for the weight 222 of approximately plus 45 degrees and minus 45 degrees from a vertical reference line is provided.

A potentiometer 228 is located at the center of the case 212, and an electrical tap 230 having a spring connection 232 is mounted to the weight 222. An electrical contact 234 extends through the center of the post and projects through the back of the case 212. The spring connection 232 is connected to the contact 234. The tap 230 is in electrical contact with the potentiometer 226 so that, upon movement of the weight 222, variable electrical resistances will be provided.

The pendulum 210 includes four terminals 236, 238, 240, 242. Referring particularly to FIG. 13, the terminal 236 is connected with the tap 230 via the contact 234, the terminals 238, 240 are connected at opposite ends of the potentiometer 228, and the terminal 242 is connected to the center of the potentiometer 228. The terminals 236, 238, 240, 242 are connected to wires disposed within a cable 244. The cable 244 enters the pendulum 210 through an opening formed in the side of the bracket 216.

In use, the pendulum 210 is filled with silicone oil and is hermetically sealed. The pendulum 210 provides an electrical resistance of 2,000 ohms, and dissipates 0.5 watt at 130 degrees Fahrenheit. The accuracy of the pendulum 210 under normal conditions is plus or minus 1 percent of indicated output.

III. The Control Module 300

Referring particularly to FIGS. 1 and 13, the control module 300 is a compact, portable unit which receives 110 volts alternating current and provides 12 volts direct current to both the laser module 20 and the sensor module 120. The control module 300 includes a voltage meter 304 having two scales (not shown) for correlating positions of the pendulum weight 222 to caster and camber readings.

The control module 300 includes a plug 306 for connection to a source of 110 volt alternating current. The module 300 includes a step-down transformer 308 for converting the 110 volt alternating current to 12 volt alternating current. A rectifier diode 310 and a resistor 312 are placed in series with each other in a line 314 connected to one side of the secondary of the transformer 308. The diode 310 rectifies the current to provide 12 volts direct current to remaining portions of the control module 300.

The laser module 20 is powered independently of the sensor module 120 by circuitry 320. The laser module circuitry includes a lighted switch 321 having a switch contact 322 and a bulb 324. The laser unit 38 receives current through a line 326 and is connected to the secondary of the step-down transformer 308 by a line 328. The lines 326, 328 are disposed within the cable 52 connecting the laser module 20 and the console 300. Upon closing the switch 321, electrical power is provided to the laser unit 38 and the illuminated condition of the switch 321 indicates to the user that electrical current is being supplied to the laser unit 38.

The control module 300 includes circuitry 340 for energizing the sensor module 120. The sensor module circuitry 340 is in parallel with the laser module circuitry 320. A double-pull, double-throw switch 342 controls the application of electrical current to the circuitry 340. The switch 342 includes a pivoting switch contact 344, one leg of which is connected to the line 314 by means of a line 346, and the other leg of which is connected to the terminal 236 by means of a line 348. A line 349 connects the lines 328, 348.

The switch 342 includes positive contacts 350, 352 and negative contacts 354, 356. A line 358 connects the contact 350 with a line 360 in electrical communication with the terminal 242 of the pendulum 210. A line 362 connects the contact 352 with the line 360, thereby placing both of the contacts 350, 352 in electrical communication with the terminal 242. A line 364 extends from the contact 354 and includes a lamp 366. The other end of the line 364 is connected to the line 358. Similarly, a line 368 is in electrical communication with the contact 356 and includes a lamp 370. The other end of the line 368 is connected to the line 362.

A line 372 connects the terminal 238 of the pendulum 210 with the positive side of the meter 304. A line 374 connects the negative side of the meter 304 to a rheostat 376. The slide wire portion of the rheostat 376 is connected to the terminal 240 by means of a line 378.

The switch 321, the switch 342, and the meter 304 are displayed on the face of the control module 300. When the contacts 322 are closed, the lamp 324 will be illuminated and electrical power will be provided to the laser unit 38. When the switch 342 is thrown to the right as viewed in FIG. 13, the contacts 352, 356 will be closed, thus providing electrical power to the lamp 370 (indicating that a camber reading is being taken) and to the meter 304 and the pendulum 210. The meter 304 includes an appropriately numbered scale (not shown) presenting camber readings. Movement of the pendulum 210 in response to different camber readings being taken will produce changes in readings of the meter 304 indicative of camber readings. The rheostat 376 can be used prior to commencement of readings to zero the meter 304.

When the switch 342 is thrown to the left as viewed in FIG. 13, the contacts 350, 354 will be closed and the lamp 366 will be illuminated (indicating that a caster reading is being taken). Electrical current also will be provided to the meter 304 and the pendulum 210. A different scale (not shown) presenting needle deflections indicative of caster readings is included as part of the meter 304. The rheostat 376 can be used to provide a zero meter reading prior to taking caster measurements.

IV. Operation

It will be assumed that it is desired to align the front wheels of a four-wheel vehicle such as a typical automobile, and also to check the position of the rear wheel housing relative to the frame. The following steps are carried out:

(1) The switch 342 is activated so that the meter 304 is energized. The magnet 172 is secured to one leg of a carpenter's level or other device suitable for measuring the inclination of the floor relative to the horizontal. The laser beam 34, because it can be directed as desired into the sensor module 120, automatically compensates for unevenness of the floor when viewing the vehicle from the side (Angle E). Accordingly, only side-to-side unevenness of the floor must be taken into account. This is done by positioning one leg of the carpenter's level in a line drawn between the approximate positions of the front wheels of the vehicle on the floor. By placing the magnet 172 on the vertically extended leg of the carpenter's level, the degree of inclination of the floor relative to the horizon can be determined. In turn, by appropriate adjustment of the rheostat 376, the meter 304 can be calibrated to a "zero" position.

(2) The vehicle is driven onto the floor and the front wheels are placed on turntables (not shown) to enable the wheels to be turned from side-to-side with little difficulty.

(3) The sensor module 120 is secured to the center of the spindle of one of the front wheels by use of the magnet 172.

(4) The laser module 20 is secured to the spindle of the rear wheel on the same side of the vehicle as that to which the sensor module 120 has been secured. Attachment of the module 20 to the spindle of the rear wheel is accomplished by use of the magnet 62.

(5) The laser module 20 and the sensor module 120 are activated by operating switches 321 and 342, respectively.

(6) The modules 20, 120 are moved along the shafts 64, 174 so that approximately a one-half inch space is provided between the end of the yokes 92, 202 and the neck-down portions 68, 178.

(7) The laser beam 34 is adjusted approximately horizontally and is centered relative to the housing 22 by use of the scale 36. Lateral measurements are made from reference points on the frame to the laser beam 34. The module 20 can be placed on the other side of the vehicle and measurements can be taken at various positions along the length of the vehicle. After the measurements have been taken on each side of the vehicle, the following situations may pertain:

(a) If both laser beams 34 are parallel with each other and also parallel with the frame, the rear housing alignment relative to the frame is correct.
  (b) If both laser beams 34 are parallel with each other but not parallel with the frame, the housing is misaligned relative to the frame.
  (c) If both laser beams 34 are not parallel with each other, one side of the housing may be correctly aligned with the frame, while the other side may not.
  (d) If both laser beams 34 are not parallel with each other, both sides of the housing may be misaligned relative to the frame.

(8) If the laser beam 34 on either side of the vehicle is not parallel with the frame, then the thumb wheel 48 is adjusted until the laser beam 34 is parallel with the frame. The extent to which the rear housing deviates from a correctly aligned position relative to the frame can be determined optically by referring to the scale 36.

(9) The front wheel to which the sensing unit 120 is attached is turned to a straight-ahead position. A camber reading is taken and recorded.

(10) The switch 242 is moved so that the meter 304 presents a caster reading. While the wheel is still in a straight-ahead position, a caster reading is taken and recorded. The front portion of the wheel is turned toward the center of the vehicle 20 degrees, and another caster reading is taken and recorded.

(11) The front portion of the wheel is turned away from the center of the vehicle 20 degrees, and another caster reading is taken and recorded.

(12) If the "wheel out" reading is positive, then a positive caster situation exists. If a negative "wheel out" reading is obtained, then a negative caster situation pertains. The absolute difference between the wheel in and wheel out caster readings is determined and the sign of the wheel out reading is used. The caster reading thus is determined and appropriate adjustments to the steering components of the vehicle are made.

For instance if the wheel out reading is three degrees positive and the wheel in reading is one degree negative, then the total caster reading is four units (difference between plus three and minus one) and the sign of the caster reading would be positive. Accordingly, the caster reading in the example given would be four degrees positve. Appropriate adjustments then could be made to the vehicle to bring the caster reading within published limits.

(13) Toe-in and toe-out readings are made by first centering the steering wheel of the vehicle and locking it in place by means of a steering wheel lock (not shown).

(14) The toe setting of each front wheel is adjusted individually, and not by reference to the other front wheel. First, it is necessary for the laser beam 34 to enter nearly exactly at the center of the slit 136. As has been indicated already, the housing 122 is moved along the shaft 174 until the ends 138B, 140B, of the rods 138, 140 are illuminated to the same extent. At this point, the laser beam 34 will be entering the housing 122 from the proper direction.

(15) Once the beam 34 is centered relative to the slit 136, the toe reading can be read directly from the scale 130. Due to the optical gain provided by the spacing between the mirrors 148, 164 and the scale 130, the tow reading is taken at an effective distance of 20 inches forwardly of the center of the spindle. This is an accepted industry standard.

By way of example, a toe-in reading of, for example, one-half inch means that the front of the wheel is moved toward the center of the vehicle one quarter inch and the rear of the wheel is moved away from the center of the vehicle one quarter inch, making a total change of one-half inch. The scale 130 is reduced in size one-half to provide a direct readout in this industry standard format. Stated otherwise, a one inch tow-in or tow-out reading on the scale 130 in reality represents a one-half inch displacement of the laser beam 34. Regardless of the displacement measured on the screen 130, the tie rods of the vehicle can be adjusted to bring the toe adjustments of the individual front wheels into conformity with published standards.

(16) After camber, caster, and toe readings have been taken, and after caster, camber, and toe adjustments have been made, the modules 20, 120 are mounted in place on the other side of the vehicle and steps 6–15 are repeated. The scales 36, 130 are printed "rightside up" and "upside down" on the panels 28, 128 in order for the modules 20, 120 to be used on both the left and right sides of the vehicle. Caster and camber readings, however, must be taken with the pendulum 210 oriented as shown in the FIGURES.

It will be apparent from the foregoing description that the modules 20, 120, and 300 are compact, relatively inexpensive, portable, and can be set up for alignment purposes in a minimal amount of time. The modules 20, 120 can be secured quickly to the wheels of most vehicles without special adaptors. Due to the circuitry 302, the modules 20, 120 can be handled with complete safety because only 12 volts direct current are provided to the modules 20, 120. It also will be apparent that the alignment system according to the invention can be used on virtually any type of floor, regardless of whether it is level, and special racks are not needed for alignment purposes. As a result of the continuous readout feature provided by the meter 304 and the scale 130, uneven vehicle load conditions can be taken into account at the start of the alignment process, and can be continuously monitored throughout the alignment process. Compared with prior alignment systems, the alignment system according to the invention is accurate, mechanically and electrically straightforward, inexpensive, and reliable.

Although the invention has been described in considerable detail, it will be understood that the present disclosure of the preferred embodiment has been made only by example and that various changes may be resorted to without departing from the true spirit and scope of the invention as hereinafter claimed. Accordingly, it is intended that the patent shall cover, by suitable expression in the appended claims, whatever features of patentable novelty exist in the invention disclosed.

What is claimed is:

1. An alignment system for measuring caster, camber, and toe-in readings of the wheels of a vehicle, comprising:
   (a) a laser beam-emitting module for attachment to a wheel on one side of the vehicle, the laser module directing a laser beam in a generally horizontal plane toward the other wheel on the same side of the vehicle; and
   (b) a sensor module secured to the other wheel on the same side of the vehicle to which the laser module is secured, the sensor module having a horizon-sensing means for measuring caster and camber, and an optical scale positionable in the path of the laser beam for measuring toe-in readings.

2. The alignment system of claim 1, wherein the laser module and the sensor module are attached to the wheels by means of magnets.

3. The alignment system of claim 1, wherein the laser module includes a polyhedron housing having rubber-capped ends, and a laser unit is disposed within the housing.

4. The alignment system of claim 1, wherein a laser unit is disposed within the laser module, the laser unit being pivotally mounted within the module and adjustable relative to the module so as to direct the laser beam outwardly of the module in a selected direction.

5. The alignment system of claim 4, wherein the laser module includes a scale by which the position of the laser unit relative to the module can be determined optically from a position externally of the module.

6. The alignment system of claim 1, wherein the sensor module includes a slit through which the laser beam can be projected, the sensor module including acrylic rods disposed on either side of the slit, the acrylic rods, upon being impinged by the laser beam, providing an optical indication of the point of impingement of the laser beam.

7. The alignment system of claim 1, wherein a first mirror is positioned within the sensor module housing and is adapted to be impinged by the laser beam, a second mirror to which the laser beam is reflected from the first mirror, and a screen onto to which the laser beam is reflected from the second mirror, the spacing between the first mirror, the second mirror, and the screen being such that an optical gain is provided.

8. The alignment system of claim 7, wherein the spacing between the first mirror, the second mirror, and the screen is such that the image of the laser beam projected onto the screen is projected a predetermined distance forwardly of the center of the spindle of the wheel to which the sensor module is secured.

9. The alignment system of claim 1, wherein the sensor module includes a polyhedron housing having rubber-capped ends.

10. The alignment system of claim 1, wherein the horizon-sensing means is in the form of an electro-mechanical pendulum, the pendulum being secured to the sensor module, the pendulum including a weight movable in a plane positioned substantially orthogonal to the longitudinal axis of the sensor module, the pendulum also including a potentiometer which, when supplied with electric current and provided with variable weight positions responsive to changes in orientation of the sensor module, will provide changes in electrical resistance which can be correlated to changes in orientation of the sensor module.

11. The alignment system of claim 1, wherein the laser module and the sensor module are attached to the wheels by means of magnets, each magnet including a shaft extending outwardly therefrom, the module including a block having an opening therethrough through which the shaft extends, a generally U-shaped yoke fitted about the shaft and disposed about the block, and a displaceable member in engagement with both the block and the yoke, the displaceable member being capable of locking the block and yoke relative to each other so that the module is rigidly secured relative to the magnet.

12. An alignment system for measuring caster, camber, and toe-in readings of the wheels of a vehicle, comprising:
   (a) a laser beam-emitting module for attachment to a wheel on one side of the vehicle, the laser module directing a laser beam in a generally horizontal plane toward the other wheel on the same side of the vehicle, the laser module being attached to the wheel by means of a magnet from which a shaft extends, the module being mounted to the shaft such that the module can be moved selectively relative to the shaft or can be fixed relative to the shaft, the module including a laser unit, the laser unit being pivotally mounted within the module and adjustable relative to the module so as to direct the laser beam outwardly of the module in a selected direction, the laser unit including a scale by which the position of the laser unit relative to the module can be determined optically from a position externally of the module; and
   (b) a sensor module secured to the other wheel on the same side of the vehicle to which the laser module is secured, the sensor module having a horizon-sensing means in the form of an electro-mechanical pendulum for measuring caster and camber, and an optical scale positionable in the path of the laser beam for measuring toe-in readings, the sensor module including a slit through which the laser beam can be projected, the sensor module including acrylic rods disposed on either side of the slit, the acrylic rods, upon being impinged by the laser beam, providing an optical indication of the point of impingement of the laser beam, the sensor module also including a first mirror positioned within the housing and adapted to be impinged by the laser beam, a second mirror to which the laser beam is reflected from the first mirror, and a screen onto which the laser beam is reflected from the second mirror, the spacing between the first mirror, the second mirror, and the screen being such that an optical gain is provided, the pendulum including a weight movable in a plane positioned substantially orthogonal to the longitudinal axis of the sensor module, the pendulum also including a potentiometer which, when supplied with electric current and provided with variable weight positions responsive to changes in orientation of the sensor module, will provide changes in electrical resistance which can be correlated to changes in orientation of the sensor module.

13. A method for measuring caster, camber, and toe-in readings of the wheels of the vehicle, comprising:

(a) providing a laser beam-emitting module;

(b) attaching the laser beam-emitting module to a wheel on one side of the vehicle;

(c) providing a sensor module for receiving the laser beam, the sensor module having a horizon-sensing means for measuring caster and camber;

(d) securing the sensor module to the other wheel on the same side of the vehicle to which the laser module is secured;

(e) measuring caster and camber by activation of the horizon-sensing means; and, (f) measuring toe-in by directing the laser beam to the sensor module and determining the point of impingement of the laser beam on the sensor module.

* * * * *